US009819602B2

(12) United States Patent
Schrum, Jr. et al.

(10) Patent No.: US 9,819,602 B2
(45) Date of Patent: Nov. 14, 2017

(54) EFFICIENT DATAGRAM SEGMENTATION AND REASSEMBLY FOR PACKET-SWITCHED NETWORKS

(71) Applicant: QUALCOMM Incorporated, San Diego, CA (US)

(72) Inventors: Sidney Brower Schrum, Jr., Ocala, FL (US); Lawrence Winston Yonge, III, Summerfield, FL (US); Richard Newman, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 14/809,995

(22) Filed: Jul. 27, 2015

(65) Prior Publication Data
US 2017/0034067 A1    Feb. 2, 2017

(51) Int. Cl.
H04L 12/805   (2013.01)
H04L 1/18     (2006.01)
H04L 1/00     (2006.01)
H04L 1/16     (2006.01)

(52) U.S. Cl.
CPC .......... *H04L 47/365* (2013.01); *H04L 1/0083* (2013.01); *H04L 1/1628* (2013.01); *H04L 1/188* (2013.01); *H04L 1/1896* (2013.01); *H04L 1/1614* (2013.01); *H04L 1/1685* (2013.01); *H04L 1/187* (2013.01)

(58) Field of Classification Search
None
See application file for complete search history.

(56) References Cited

U.S. PATENT DOCUMENTS 6,400,720 B1 *  6/2002  Ovadia ............ H04L 29/06027
                                              370/395.2
7,630,305 B2   12/2009  Samuels et al.
7,764,616 B2    7/2010  Miyake
(Continued)

FOREIGN PATENT DOCUMENTS

WO       2014014577 A1    1/2014

OTHER PUBLICATIONS

International Search Report and Written Opinion—PCT/US2016/036979—ISA/EPO—dated Oct. 18, 2016.

*Primary Examiner* — Steven H Nguyen
(74) *Attorney, Agent, or Firm* — The Marbury Law Group

(57) ABSTRACT

Described herein is datagram segmentation and acknowledgment in a network. A communication node in the network may determine a length of a datagram is greater than a maximum protocol data unit (PDU) length of a protocol of the network and create a segmented message comprising the datagram and a payload length field indicating the length of the datagram. The node may then segment the segmented message into segments and create a PDU comprising one or more of the segments and a segment number least significant bits (LSB) field comprising least significant bits of a segment number associated with the one or more segments. The PDUs may be acknowledged using selective acknowledgment (SACK) messages. The SACK message may comprise a SACK type indicator, a segment number most significant bits (SN_MSB) indicator, and a payload comprising one or more least significant bits (LSBs) of a segment of the segmented message.

14 Claims, 5 Drawing Sheets

(56) References Cited

U.S. PATENT DOCUMENTS

| | | |
|---|---|---|
| 7,808,910 B2 | 10/2010 | Igarashi et al. |
| 8,660,013 B2 | 2/2014 | Yonge, III et al. |
| 2001/0024435 A1* | 9/2001 | Birdwell ............ H04B 7/18584 370/349 |
| 2002/0016852 A1* | 2/2002 | Nishihara .......... H04Q 11/0478 709/236 |
| 2002/0054570 A1 | 5/2002 | Takeda |
| 2003/0012212 A1* | 1/2003 | Earnshaw ............. H04L 1/1621 370/428 |
| 2003/0123481 A1* | 7/2003 | Neale ................ H04B 7/18582 370/466 |
| 2003/0169769 A1* | 9/2003 | Ho ........................ H04L 1/1621 370/473 |
| 2005/0165950 A1* | 7/2005 | Takagi ................. H04L 12/413 709/236 |
| 2005/0238054 A1* | 10/2005 | Sharma ................ H04L 1/1642 370/473 |
| 2007/0291778 A1* | 12/2007 | Huang ................. H04L 1/1614 370/410 |
| 2008/0049754 A1* | 2/2008 | Kim ....................... H04L 1/165 370/394 |
| 2008/0219291 A1* | 9/2008 | Obuchi ................ H04L 1/1887 370/469 |
| 2010/0118986 A1* | 5/2010 | Hong ................... H04L 1/1829 375/259 |
| 2012/0314719 A1* | 12/2012 | Agiwal ................ H04W 28/02 370/474 |

\* cited by examiner

EFFICIENT DATAGRAM SEGMENTATION AND REASSEMBLY FOR PACKET-SWITCHED NETWORKS

TECHNICAL FIELD

The present application generally relates to communications between networked devices, more specifically, to efficient datagram segmentation and reassembly for packet-switched networks.

BACKGROUND

Networked nodes typically communicate with one another using a communication protocol, for example the IEEE 802.11 series of protocols commonly known as WiFi, HomePlug® protocols for power-line communication, or other protocols for communication between nodes. Some protocols are contention based allowing many nodes to share a single communication medium. Contention based protocols may transmit data on the communication medium using protocol data units (PDU). In a contention based protocol using the open systems interconnection (OSI) model, various layers may have PDUs associated with them. Some protocols limit the maximum size of PDUs. If a sender has a large datagram to transmit, the datagram may need to be segmented in order to be transmitted. A datagram is a message to be sent over a network. The datagram typically has a source and destination address, a payload, and other routing or control data as required. Datagrams that are too large to fit into a single PDU are segmented between multiple PDUs. The datagram is then reassembled at the destination. Segment numbers are inserted into the PDUs to identify the order in which the datagram should be reassembled by the receiver. Additionally, in some protocols, acknowledgements are sent by the receiver to indicate that the segment has been received. The required overhead of transmitting segment numbers and acknowledgements for each PDU becomes burdensome when the protocol uses small PDUs.

SUMMARY

Described herein are various embodiments of efficient datagram segmentation and reassembly for packet-switched networks. In an embodiment, a communication node in a network is provided. The communication node may comprise an I/O module. The communication node may further comprise a processor coupled to the I/O module, the processor may be configured to: determine a length of a datagram is greater than a maximum protocol data unit (PDU) length of a protocol of the network; create a segmented message comprising the datagram and a payload length field indicating the length of the datagram; segment the segmented message into a plurality of segments, each of the plurality of segments is of equal length; create a PDU comprising one or more of the segments and a segment number least significant bits (LSB) field, the segment number LSB field comprising a plurality of least significant bits of a segment number associated with the one or more of the segments; and transmit via the I/O module the PDU to a receiving node.

In another embodiment, a communication node in a network is provided. The communication node may comprise an I/O module. The communication node may further comprise a processor coupled to the I/O module, the processor may be configured to: receive from a transmitting node via the I/O module, a plurality of PDUs, each of the plurality of PDUs comprising one or more segments of a segmented message; determine a condition has been met for transmitting a selective acknowledgment (SACK) message; create the SACK message, the SACK message comprising a SACK type indicator, a segment number most significant bits (SN_MSB) indicator, and a payload; and transmit the SACK message to the transmitting node.

In yet another embodiment, a method for segmenting and transmitting a datagram by a communication node in a network is provided. The method may comprise: determining a length of the datagram is greater than a maximum protocol data unit (PDU) length of a protocol of the network; creating a segmented message comprising the datagram and a payload length field indicating the length of the datagram; segmenting the segmented message into a plurality of segments, each of the plurality of segments is of equal length; creating a PDU comprising one or more of the segments and a segment number least significant bits (LSB) field; and transmitting the PDU to a receiving node.

BRIEF DESCRIPTION OF THE DRAWINGS

Reference is now made to the following detailed description, taken in conjunction with the accompanying drawings. It is emphasized that various features may not be drawn to scale and the dimensions of various features may be arbitrarily increased or reduced for clarity of discussion. Further, some components may be omitted in certain figures for clarity of discussion.

Although similar reference numbers may be used to refer to similar elements for convenience, it can be appreciated that each of the various example embodiments may be considered distinct variations.

DETAILED DESCRIPTION

In some embodiments, datagram segmentation efficiency may be improved by creating segments of the same length and transmitting them in PDUs with partial sequence numbers rather than the entire sequence number. By maintaining a fixed segment size, receivers may predict the number of segments that should be received. In some embodiments, acknowledgements of the received segments may be improved by acknowledging multiple received segments in a single selective acknowledgement (SACK) message.

Figure 1:
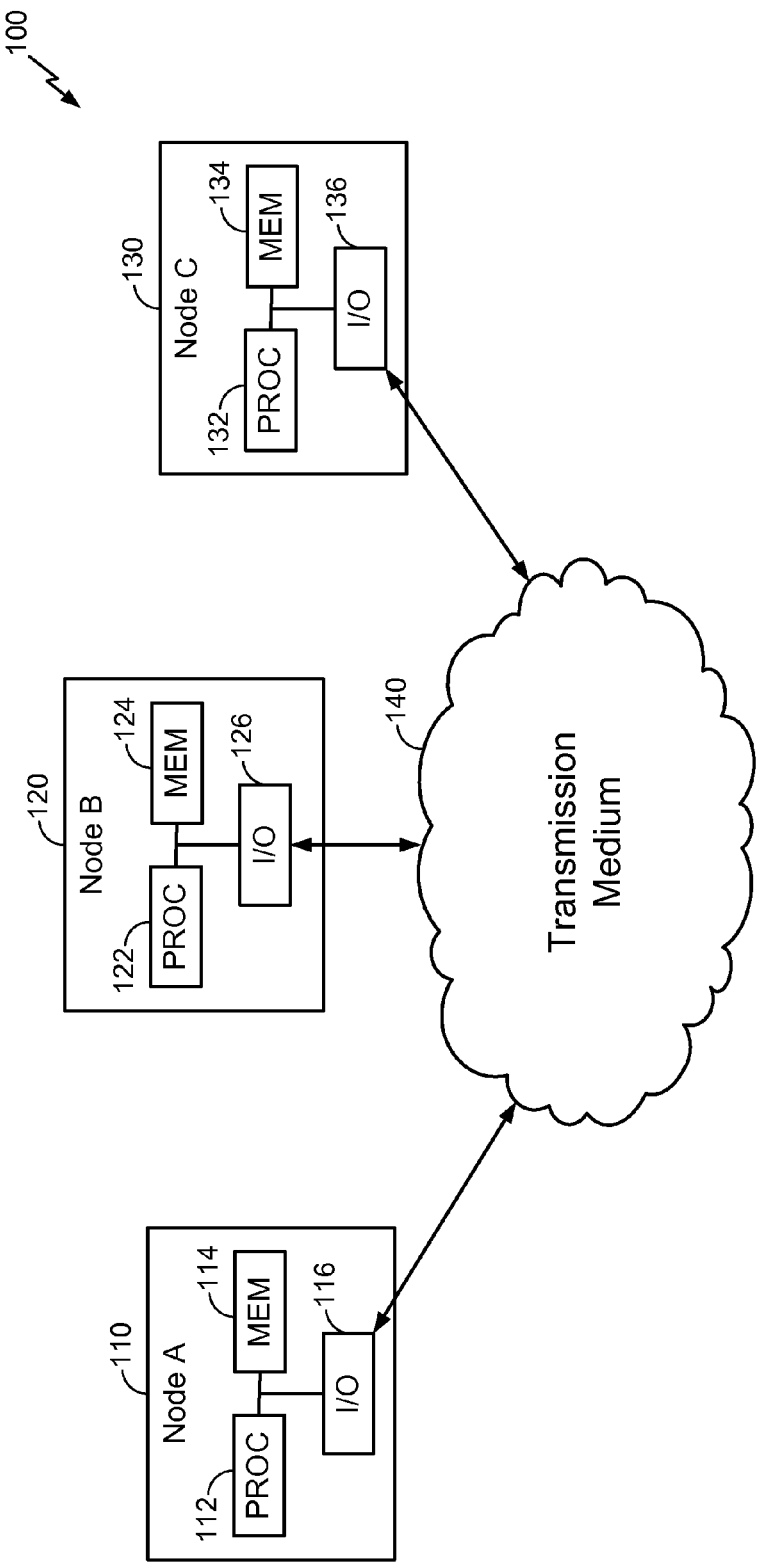
FIG. 1 is a diagram of an embodiment of a network comprising nodes configured for datagram segmentation.

FIG. 1 is a diagram of a network 100 comprising nodes configured for efficient datagram segmentation. Network 100 may comprise several nodes: node A 110, node B 120, and node C 130. Network 100 may also comprise a transmission medium 140. Node A 110, node B 120, and node C 130 may communicate with each other and other devices not pictured via transmission medium 140. Node A 110 may comprise a processor 112, memory 114, and an I/O module 116. Processor 112, memory 114, and I/O module 116 may be electrically coupled to one another by a communication bus. The communication bus may enable the components to communicate with one another. Node B 120 and Node C 130 may be similar to Node A 110 and comprise similar components as those described for Node A 110. For example, node B 120 may comprise a processor 122, memory 124, and an I/O module 126. Processor 122, memory 124, and I/O module 126 may be electrically coupled to one another by a communication bus. The communication bus may enable the components to communicate with one another. As a further example, node C 130 may comprise a processor 132, memory 134, and an I/O module 136. Processor 132, memory 134, and I/O module 136 may be electrically coupled to one another by a communication bus. The communication bus may enable the components to communicate with one another. Each of the nodes may communicate with one another via the transmission medium 140. While three nodes are depicted, embodiments may include any number of nodes. The transmission medium 140 may be wired and/or wireless in accordance with the communication protocol used by network 100. Node A 110 may be configured as a master device. Node B 120 and node C 130 may both be configured as slave devices. Master devices may be configured to control transmissions on network 100. Slave devices may receive instructions from a master device directing when and/or how communications should be performed.

As used herein, processors may control the functions of a node. Any actions described as being taken by a processor may be taken by the processor alone or by the processor in conjunction with one or more additional components. Additionally, while only one processor may be shown in certain devices, multiple processors may be present. Thus, while instructions may be discussed as being executed by a processor, the instructions may be executed simultaneously, serially, or otherwise by one or multiple processors. A processor may be implemented as one or more CPU chips and may be a hardware device capable of executing computer instructions. The processor may execute instructions, codes, computer programs, or scripts. The instructions, codes, computer programs, or scripts may be received from an I/O module or from memory.

As used herein, an I/O module may include modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. I/O modules may also include liquid crystal displays (LCDs), touch screen displays, keyboards, keypads, switches, dials, mice, track balls, voice recognizers, card readers, paper tape readers, printers, video monitors, or other well-known input/output devices.

As used herein, memory may include random access memory (RAM), read only memory (ROM), or various forms of secondary storage. RAM may be used to store volatile data and/or to store instructions that may be executed by a processor. ROM may be a non-volatile memory device that may have a smaller memory capacity than the memory capacity of a secondary storage. ROM may be used to store instructions and/or data that may be read during execution of computer instructions. Access to both RAM and ROM may be faster than access to secondary storage. Secondary storage may be comprised of one or more disk drives or tape drives and may be used for non-volatile storage of data or as an over-flow data storage device if RAM is not large enough to hold all working data. Secondary storage may be used to store programs that may be loaded into RAM when such programs are selected for execution. As used herein, a bus may be multiple buses (frontend, backend, etc.), each of which may be used for communication between two or more components of a node.

Figure 2:
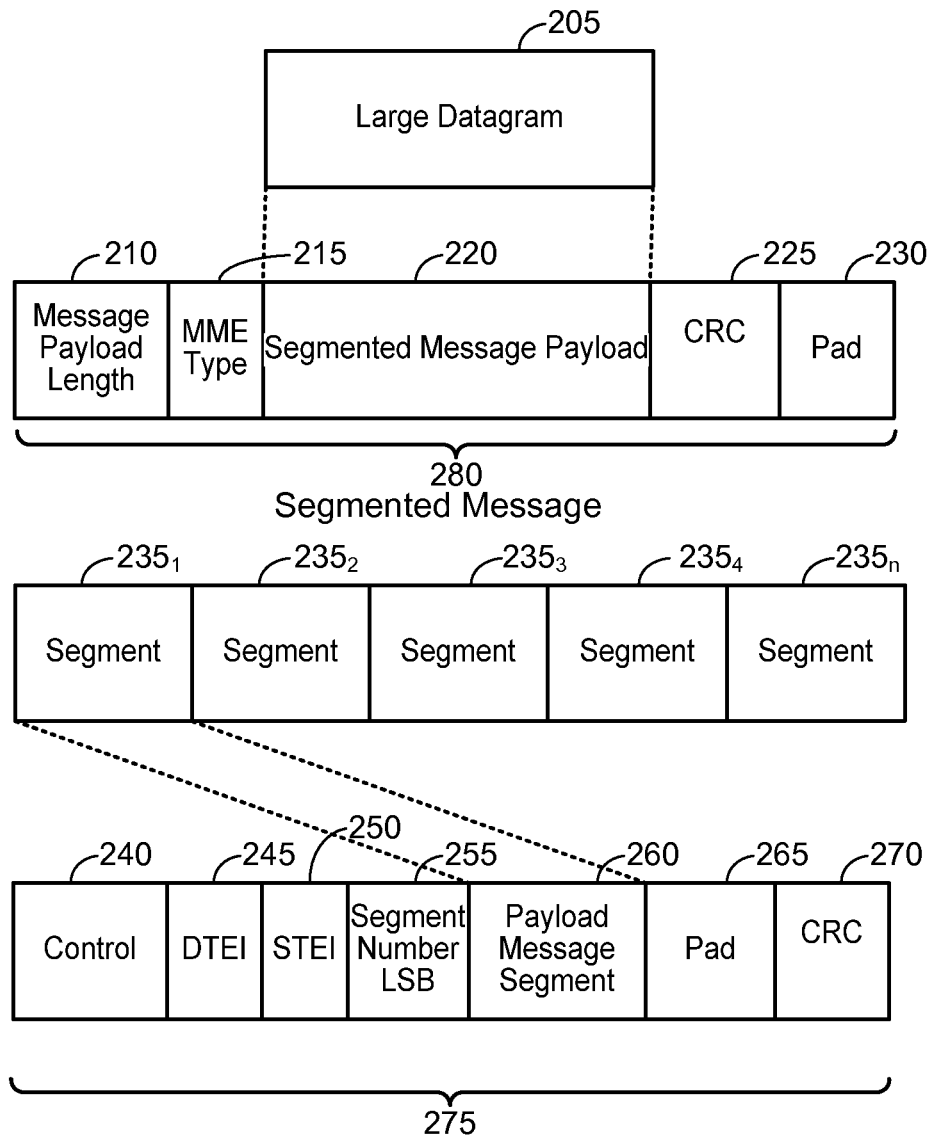
FIG. 2 is a diagram of an embodiment of datagram segmentation.

Turning now to FIG. 2, a diagram of an embodiment of efficient datagram segmentation is provided. A node, for example node A 110, may have a large datagram 205 for transmission. Large datagram 205 may be larger than the payload size permitted for a single PDU in network 100. PDUs described herein may be media access control (MAC) layer PDUs (MPDUs) or any other type of PDU as required by the protocol used in network 100. The size of large datagram 205 may be limited based upon the characteristics of nodes within the network 100. Master nodes may be programmed with the maximum supported length, or the maximum supported length may be communicated from slave nodes to the master node. Node A 110 may prepare datagram 205 for segmentation by forming segmented message 280. Segmented message 280 may comprise a message payload length field 210. Message payload length field 210 may indicate the size of segmented message payload 220. Management message entry (MME) type field 215 is an optional field that may be used to indicate the type of MME message being transmitted when the large datagram 205 is an MME message. Segmented message 280 may further comprise a cyclic redundancy check (CRC) field 225 for error detection. In some embodiments, error-detection, error-correction, or authentication mechanisms other than cyclic redundancy check may be used in place of CRC field 225. An optional all-zero pad 230 may be added to segmented message 280, such that the total length of the segmented message 280 is a multiple of eight bytes in length. Segmented message 280 may then be divided into eight-byte segments 235 ($235_1$-$235_n$). In some embodiments, segments may be a different fixed length, e.g., 16 bytes. In these embodiments, the pad 230 may be selected such that the total length of the segmented message 280 is an integer multiple of whatever length (e.g., any positive integer number of bits) is selected for the segments. In some embodiments, the pad may be other than all zeros, such as random values, all pad bytes encoding the pad length, or some other form of padding.

Segments 235 may be transmitted in PDU 275. Node A 110 may prepare PDU 275 for transmission. In some protocols, PDU length may be fixed at 16 bytes. When PDU length is fixed at 16 bytes, one segment 235 may be transmitted in the payload message segment 260. In other protocols, PDU length may be fixed at 32 bytes. When PDU length is fixed at 32 bytes, three segments 235 may be transmitted in the payload message segment 260. In other embodiments, different numbers of segments 235 may be transmitted as payload dependent upon segment size and PDU size. PDU 275 may also comprise a control field 240. Control field 240 may be used to provide control information regarding the transmission of PDU 275. In some embodiments, control field 240 may contain a segmented message information field. The segmented message information field may be used to identify whether a PDU comprises message segments and/or how the message segments are identified. For example, segmented message information field may be two bits; if the field is set to 00, then a segment is not present; if the field is set to 01, then a segment is present and the PDU contains the first segment of the segmented message; if the field is set to 10, then the a segment is present and the PDU does not contain the first segment of the segmented message. Value 11 may be reserved for future use. Destination terminal equipment identifier (DTEI) field 245 may contain an indicator associated with the destination node. Source terminal equipment identifier (STEI) field 250 is optional and may contain an indicator associated with the source node.

Each segment 235 may be assigned a segment number. The segment number of the first segment may be zero with the number of the second segment being one and so on. In some embodiments, the segments numbers may start at some other number and increase sequentially. In some embodiments, segment numbers may continue sequential numbering across message boundaries (that is, the first segment of one message may have a value one greater than the last segment of the preceding message). The segment number may, for example, comprise 14 bits. The number of bits allocated to segment numbers may be selected based on the maximum number of segments to be transmitted, or may be selected based on the number of segments that may be transmitted without acknowledgement. For example, a 14 bit sequence number may represent values from 0 to 16,383. The least significant eight bits of the segment number of segment 235 in payload message segment 260 may be included in sequence number LSB field 255. Pad 265 may be an optional all zero pad used to fill empty space in PDU 275. In some embodiments, pad 265 may be filled with values other than all zeros. CRC field 270 may be used for error detection. In some embodiments, other error-detection, error-correction, or authentication mechanisms may be used in place of a CRC.

Figure 3:
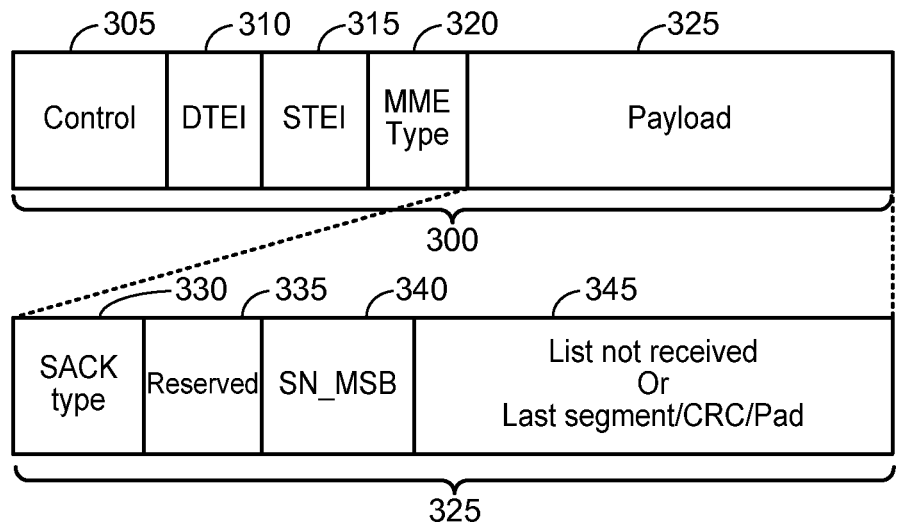
FIG. 3 is a diagram of an embodiment of a selective acknowledgement (SACK)

When a node receives PDUs, the node may transmit one or more acknowledgements to the sender. FIG. 3 is a diagram of an embodiment of a selective acknowledgement (SACK) 300. SACK 300 may comprise a control field 305, DTEI field 310, STEI field 315, MME type field 320, and payload 325. Control field 305 may be used to provide control information regarding the transmission of SACK 300. DTEI field 310 may contain an indicator associated with the destination node of the SACK 300. STEI field 315 may contain an indicator associated with the source node of SACK 300. MME type field 320 may be used to indicate the type of MME message being acknowledged by SACK 300.

Payload 325 may comprise a SACK type field 330. SACK type field 330 may be a single bit indicator indicating the type of SACK message that SACK 300 is. For example, if SACK type field 330 is "1" it may indicate that SACK 300 contains a segment number list of segments not received. Continuing the example, if SACK type field 330 is "0" it may indicate that all segments were successfully received. In some embodiments, SACK type field 330 may comprise more bits and may indicate other types of SACKs as used by the protocol of network 100. Payload 325 may also contain a reserved field 335. Reserved field 335 may be reserved for future use depending upon changes to the protocol, format of the payload, etc.

Contents of field 340 may include the segment number most significant bit (SN_MSB) variable. SN_MSB may vary depending upon the value of the SACK type field 330. If the SACK type field 330 is set to "0", then SN_MSB may be set to the most significant 6 bits of the segment number of the first missing segment. If SACK type field 330 is set to "1", then SN_MSB may be set to the most significant six bits of the last segment number in the message. In some embodiments, a different number of most significant bits may be used. In some embodiments, bits other than the most significant bits may be used.

Contents of field 345 may vary depending upon the value of the SACK type field 330. If SACK type field 330 is set to "0", field 345 may contain a list of segment number least significant bits (LSBs) of segments that were not successfully received. The list may be defined by the range (SN[n], n=0-m), where SN[n] is the segment number and SN[m] is the segment number of the last segment known not to be received. For example, m+1 segments may be NACKed by explicitly naming their segment numbers, using the value of the SN_MSB field as the MSBs and the LSBs in the list as the LSBs of the NACKed segments. In this way, the MSBs may only have to be given once, saving space in the SACK. Each segment number LSB in the list may be one byte in length. The first segment number LSB (SN[0]) is the segment number LSB of the oldest segment not received. If SN[n]>SN[n+1], then in the example described herein, the most significant 6 bits of the segment number corresponding to SN[n+1] is SN_MSB+1 modulo $2^6$. That is, the segment number may be taken to "wrap around." Segment numbers may be sent in sequentially increasing order, and the segment numbers in the SACK may be given within the range of unacknowledged segment numbers, also in increasing order, and wrapping around when the segment number LSB reaches its maximum value (i.e., 255 in the case of 8-bit LSB values). If fewer than m segments are to be NACKed, then the last segment number LSB in the list may be repeated to fill all m segment number LSB fields (in the example provided herein, this would be eight bytes). In some embodiments, rather than repeating the last segment number LSB, a count field or some other indicator may be used to indicate the number of segments identified by LSBs in field 345. In some embodiments, rather than repeating the last segment number LSB, the number of LSBs included in field 345 may be inferred. The transmitting node may be configured to not send more than 128 segments past the segment number corresponding to SN[0] inclusive, or in general, half of the number of possible values expressible by the LSB field. A receiving node may send multiple SACK MMEs if the list of unsuccessfully received segments is longer than can be indicated in a single SACK. If SACK type field 330 is set to "1", field 345 may contain one byte with segment number LSB of the last segment of segmented message 280, followed by four bytes containing the CRC field 225, followed by an all-zero-byte fill to bring SACK 300 to the appropriate PDU size of the protocol of network 100.

In some embodiments, SACK 300 may comprise additional fields. The additional fields may be used to indicate that the receiving node is busy, e.g. the receiver node buffers are full. The additional fields may be used to indicate that the transmitting node should retransmit at a future time. The additional fields may be used to indicate that the segmented message is too long to handle. Other additional fields may be used as required by the protocol used in network 100.

In some embodiments, a receiving node may be configured to transmit a SACK message if a segment is received with a segment number that is 64 larger than the last acknowledged segment, or some threshold determined by the size of the LSB field, and the receiver has not transmitted an acknowledgement since receiving a predetermined number of segments. In some embodiments, a receiving node may be configured to transmit a SACK message if a segmented message has not been completely received and a segment has not been received for an interval of a predetermined number of milliseconds. In some embodiments, a receiving node may be configured to transmit a SACK message if all segments of a segmented message are successfully received. While several scenarios for transmitting SACKs are described above, any combination of the three may be used or other factors may be considered for SACK transmission depending upon the protocol of network 100. By acknowledging multiple segments in one SACK, overhead on the network 100 may be reduced, and by including the MSB field once instead of once per segment number, more segments may be acknowledged in a single SACK of fixed size.

In an embodiment, a datagram three-byte segmented message "timestamp" number may be formed from the lower order 18 bits of a beacon number concatenated with the upper 6 bits of the medium access slot (MAS) number of the MAS used to transmit the PDU containing the first byte of data from the segmented message. MAS number may be the index of the slot in a larger frame that has been divided into a fixed number of transmission slots. A single transmission may occupy one or more consecutive slots, and the slots may be allocated centrally, in a distributed manner, or via a protocol in which collisions are possible. The frames may be used to have repeating or otherwise predictable assignments of slots to particular purposes, such as an allocation for a specific node to transmit to another node, and these frames may be synchronized by the presence of a beacon transmission from a master node. The beacon may contain scheduling information along with a sequential beacon number. The three-byte segmented message "timestamp" number may function similarly to a sequence number in determining datagram (segmented message) boundaries. This timestamp number may not be included in the PDUs that contain message segments as it may be known to both the transmitter node and receiver node from a beacon sent in the frame in which the PDU is sent, and the slot within the frame that the PDU is sent. The timestamp number may be included in SACK messages and SACK retransmission request messages. The timestamp number may be the first three-byte field in the payload of the SACK message and SACK retransmission request message.

The timestamp number may allow the receiver node to infer the segmented message number based on when the first segment of a segmented datagram is received. In the case that the receiver node fails to receive the first segment sent from the transmitting node, the transmitter node and receiver node may infer the correct segmented message referred to by a SACK message and SACK retransmission request message by the proximity in time between the timestamp number in the SACK or SACK retransmission request message, and the timestamp number based on when the transmitter node transmitted the first segment of the segmented message.

In a first embodiment, an entire payload is used as a bitmap for segment receipt status, starting at SN_MSB concatenated with zeroes. For example, if the SN_MSB field is 6 bits with hexadecimal value 0x2a, and the LSB fields are 8 bits each, then the bitmap starts with segment number 0x2a00 and continues to a maximum segment number that the payload will permit.

Referring to the previous example, in a second embodiment, the payload may not be large or long enough to handle a bitmap for all segment numbers between 0x2a00 and 0x2aff (e.g., SN_MSB concatenated with all zeroes and SN_MSB concatenated with all ones). In such an instance, the bitmap would need to have 256 bits, or 32 bytes, to hold the entire bitmap. If the LSB field is smaller than 8 bits, then the first embodiment may always work (e.g., if the MSB field is 6 bits, the sequence numbers are 12 bits, and the payload has at least 64 bits). But if the payload is small and the LSB field is large relative to the payload, then the second embodiment is needed.

In the second embodiment, the bitmap segment numbers start at SN_MSB ||MSB_extension||0^k, where k=(bit length of sequence numbers−length of SN_MSB−length of MSB_extension). If k=0, the complete segment number of the starting point of the bitmap is provided. The rest of the payload is the bitmap, reduced in size since the MSB_extension field takes up part of the payload. If there are at least 2^k bits in the bitmap field, then the last k bits of the starting segment number can be zeroes, thereby saving on the bits used for the MSB_extension field.

As an example, if the payload has a length of 10 bytes, then this payload can code a bitmap of 80 sequence numbers, which is not sufficient for an 8-bit LSB (or for a 6-bit SN_MSB and 14-bit sequence numbers). However, a 2-bit MSB_extension field concatenated with the 6-bit SN_MSB field produces the 8 MSBs of the starting sequence number, and requires 2^6=64 bits in the bitmap to cover all sequence numbers that start with those 8 bits. The payload can be divided into 2 bits of MSB_extension and 78 bits of bitmap, so that all 64 6-bit LSBs are covered, and so that several more LSBs past that number (64) are also covered.

Figure 4:
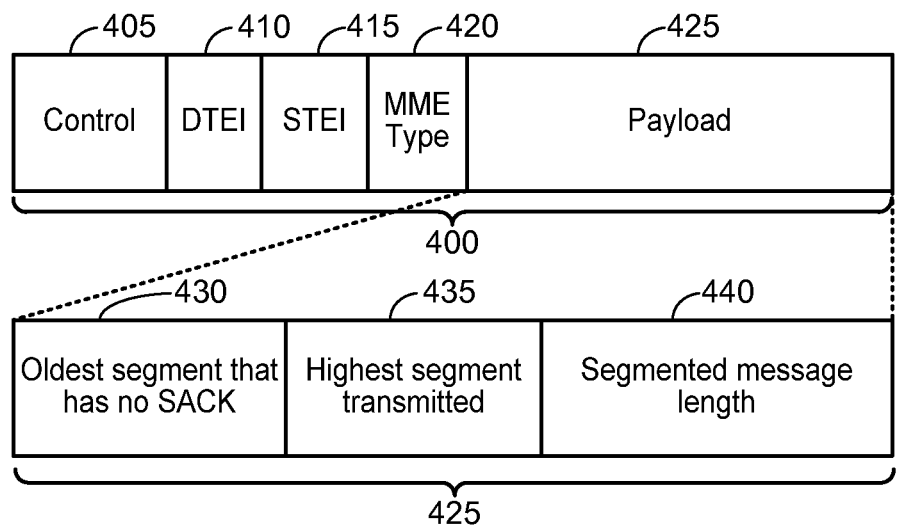
FIG. 4 is a diagram of an embodiment of a SACK retransmission request.

If a transmitting node does not receive a SACK message after a predetermined amount of time or transmissions, the transmitting node may send a SACK retransmission request to the receiving node. FIG. 4 is a diagram of an embodiment of a SACK retransmission request 400. The SACK retransmission request 400 may comprise a control field 405, DTEI field 410, STEI field 415, MME type field 420, and payload 425. The control field 405 may be used to provide control information regarding the transmission of SACK retransmission request 400. The DTEI field 410 may contain an indicator associated with the destination node of the SACK retransmission request 400. The STEI field 415 may contain an indicator associated with the source node of SACK retransmission request 400. The MME type field 420 may be used to indicate the type of MME message being queried by SACK retransmission request 400. The payload 425 may comprise an oldest segment field 430, a highest segment field 435, and a message length field 440. The oldest segment field 430 may comprise the oldest segment number for any segments that have not been acknowledged as successfully received. The highest segment field 435 may comprise the highest segment number LSB transmitted to the receiver. The message length field 440 may comprise the length of segmented message 280.

Figure 5:
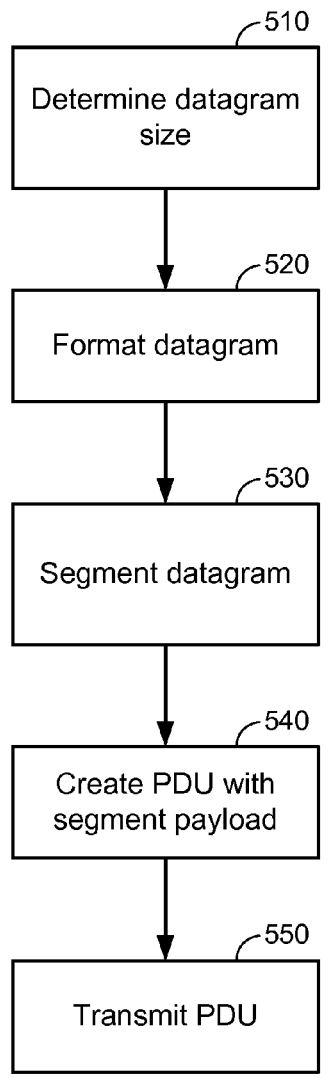
FIG. 5 is a diagram of an embodiment of a method for datagram segmentation.

FIG. 5 is a diagram of an embodiment of a method for efficient datagram segmentation. The method begins at step 510 when a transmitting node determines that the size of a datagram for transmission is too large for a single PDU. The PDU size may be determined based on upon the type of protocol in use in the network that the transmitting node is part of. At step 520, the transmitting node may format the datagram for transmission. Formatting may include adding a segmented message payload length field, a CRC-32 field, and an all-zero pad field to the datagram. The all-zero pad may be optional to bring the message to be segmented to a size that may be segmented into a number of segments having the same length. For example, if the segments are to be eight-byte segments, the all-zero pad may be selected to bring the message to be segmented (280) to a multiple of eight bytes. An additional optional field may be included that identifies the MME type when the datagram is an MME message. Once the datagram has been formatted for transmission, it may be segmented at step 530. In some embodiments the segments may be eight-byte segments. The segment size may be selected based upon the protocol used in network 100. Once the segments are created, a PDU for transmission of one or more segments may be created. In some embodiments, segments from more than one datagram may be included in a single PDU. In some embodiments, the PDU may include a control field, a DTEI field, an optional STEI field, a sequence number LSB, the segment as a message payload, and a CRC-32 field. In some embodiments more than one segment may be transmitted as payload. In some embodiments other error correction, error-detection, or authentication methods may be used in place of the CRC-32 field. After the PDU is created in step 540, it may be transmitted to the receiver node at step 550.

Figure 6:
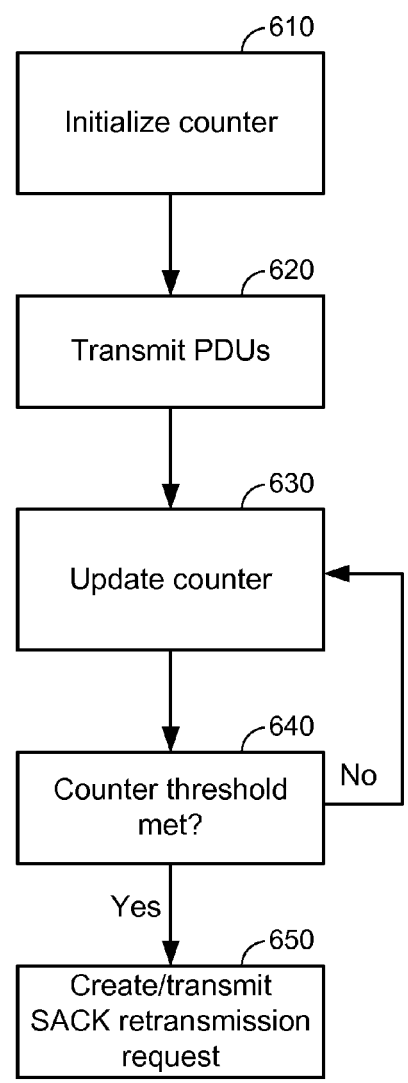
FIG. 6 is a diagram of an embodiment of a method for SACK retransmission request transmission.

FIG. 6 is a diagram of an embodiment of a method for efficient SACK retransmission request transmission. The method begins at step 610 when a transmitting node may initialize a counter. At step 620, the transmitting node may begin transmitting PDUs containing message segments of a segmented message. At step 630, the transmitting node may update a counter. The counter may be updated or incremented based on one or more of the following: 1) transmission of a PDU; 2) receipt of a SACK message; 3) passage of time; and 4) transmission of a SACK retransmission request. In other embodiments, the counter may be updated based on some other statistic related to transmission of the PDUs containing message segments. At step 640, the transmitting node may determine whether the counter has reached a threshold. If the counter has not reached the threshold, the process returns to step 630 where the counter may be updated again. When the counter reaches the threshold, the transmitting node may create and transmit a SACK retransmission request message for transmission to the receiving node at step 650. The SACK retransmission request message may be similar to SACK retransmission request 400.

Figure 7:
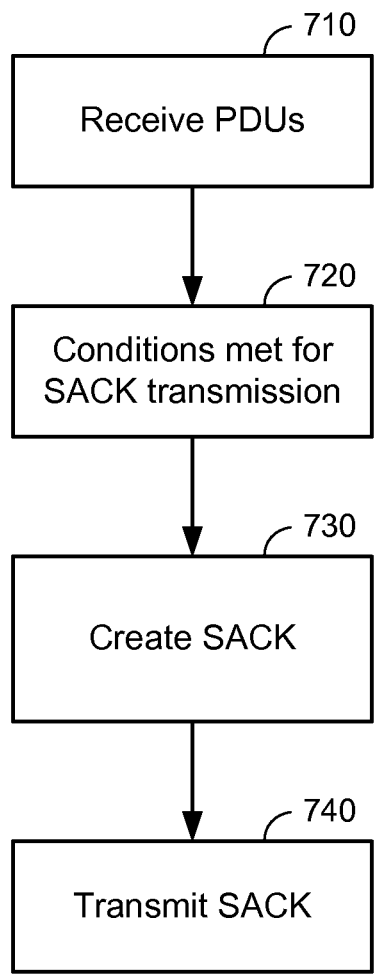
FIG. 7 is a diagram of an embodiment of a method for SACK transmission.

FIG. 7 is a diagram of an embodiment of a method for efficient SACK transmission. The method begins at step 710 when a receiver node receives a PDU containing a message segment. At step 720, the receiving node determines that a condition or combination of conditions has been met for transmission of a SACK message. The conditions may include, but are not limited to, the receiving node receives a segment with a segment number that is 64 (or some other threshold that may depend on the length of the LSB field) larger than the last acknowledged segment (send SACK to advance sender's window used for sending segments before wrap-around); the receiver has not transmitted an acknowledgement since successfully receiving a predetermined number of segments (advance sender's window, keep segments flowing smoothly); the receiver has not transmitted an acknowledgement since detecting a predetermined number of missing or damaged segments (request sender to resend the missing or damaged segments); the receiver has not completely received a segmented message and a segment has not been received for an interval of a predetermined amount of time (sender at the transmitting node may have sent all segments of the segmented message, but some segments may have been lost during transmission); and the receiving node has received all segments of a segmented message successfully (letting a sender at the transmitting node know that the message has been reassembled correctly). While several conditions for transmitting SACK messages are described, any combination of the five may be used or other conditions may be considered for SACK message transmission depending upon the protocol of the network of the transmitting and receiving nodes. Once the condition is met for transmission of a SACK message, the receiving node may create a SACK message similar to SACK 300. After the SACK message is created, it may be transmitted to the transmitting node at step 740.

An embodiment includes a set of rules that applies to the transmitting node and a set of rules that applies to the receiving node. These rules ensure that, when transmitted PDUs (including SACK PDUs) are not successfully received by the intended recipient at the receiving node, loss of synchronization between the transmitting node and the receiving node with resulting datagram reassembly failure is avoided. In this embodiment, the transmitting node is not allowed to retransmit a segment unless the segment is explicitly indicated as not being received in a SACK message. In a situation where the SACK message is not received, the transmitting node cannot just resend the segment, but instead sends a SACK retransmission request message to a receiving node. A receiving node that receives a SACK retransmission request from the transmitting node sends one or more SACK messages which indicate the segments that were not received at the receiving node. The transmitting node, after receiving a SACK message that indicates which segments were not received, re-transmits those segments. Therefore, the transmitting node cannot retransmit a segment unless the receiving node indicates that the segment was not received in a SACK message.

In some embodiments, a bitmap may be used in the SACK as long as information is available regarding where the sequence numbers start corresponding to the bits in the bitmap. This bitmap may enable ACK/NACKing many more segments in a single SACK. In some embodiments, more bits may need to be included in the MSB to know where to start the sequence numbers.

Two approaches associated with PDUs carrying data may be used to associate sequence numbers with segments. In one approach, segments may be consecutive, and only the first segment sequence number is needed to associate sequence numbers with segments. In a second approach, an SN_MSB is provided, along with an LSB per segment in order to associate sequence numbers with segments. This second approach is especially useful for retransmitted segments, where the retransmitted segment is not retransmitted immediately or consecutively after transmission of the original segment.

Approaches are also provided to handle sequence numbers when two or more segments are sent from a transmitting node. One approach is to have segments sent in a single PDU have consecutive sequence numbers (modulo wrap-around), and be in order (modulo wrap-around). In such an approach, a single LSB field suffices, establishing the full sequence number of the first segment in the PDU, with the segment numbers of the following segments incrementing that sequence number modulo $2^n$, where n is the number of bits in the full sequence number (e.g., 14).

Another approach is to have an LSB field in the PDU for each segment, with the sequence number for the corresponding segment formed by concatenating the SN_MSB field with the associated LSB field. In this manner, the MSBs need to be provided once, while the LSBs are provided for each segment. As in the case of the SACK, if the segment numbers wrap around, then the LSB value for a later segment will be smaller than the LSB value for an earlier segment, in which case the SN_MSB field value is incremented before the SN_MSB field is concatenated with the LSB field to derive the sequence number.

As used herein, networks may represent any form of communication network between connected machines and any other network elements, and may also represent a collection of machines or virtual machines operable to provide cloud computing services to users. Networks may include a public cloud or a private cloud. Networks may include routers, hubs, switches, firewalls, content switches, gateways, call controllers, and/or any other suitable components in any suitable form or arrangement. Networks may include, in whole or in part, one or more secured and/or encrypted Virtual Private Networks (VPNs) operable to couple one or more network elements together by operating or communicating over elements of a public or external communication network.

Nodes may include any device with a network interface, which includes, but is not limited to, network components, desktop computers, laptops, or mobile devices. A node may be a virtual machine, computer, device, instance, host, or machine in a networked computing environment.

While various embodiments in accordance with the disclosed principles have been described above, it should be understood that they have been presented by way of example only, and are not limiting. Thus, the breadth and scope of the embodiments should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the embodiments set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any embodiments in this disclosure. Neither is the "Summary" to be considered as a characterization of the embodiments set forth in issued claims. Furthermore, any reference in this disclosure to "embodiment" in the singular should not be used to argue that there is only a single point of novelty in this disclosure. Multiple embodiments may be set forth according to the limitations of the multiple claims issuing from this disclosure, and such claims accordingly define the embodiments, and their equivalents, that are protected thereby. In all instances, the scope of such claims shall be considered on their own merits in light of this disclosure, but should not be constrained by the headings herein.

What is claimed is:

1. A communication node in a network, the communication node comprising:
   an I/O module; and
   a processor coupled to the I/O module, the processor configured to:
      determine whether a length of a datagram is greater than a maximum protocol data unit (PDU) length of a protocol of the network;
      create a message for segmenting comprising the datagram and a payload length field indicating the length of the datagram;
      segment the message into a plurality of segments, each of the plurality of segments is of equal length;
      create a PDU comprising one or more of the segments and a segment number least significant bits (LSB) field, the segment number LSB field comprising a plurality of least significant bits of a segment number associated with the one or more of the segments;
      transmit via the I/O module the PDU to a receiving node;
      receive a selective acknowledgment (SACK) message from the receiving node, the SACK message comprising entries corresponding to segment numbers that were not received by the receiving node, wherein a segment number most significant bits (SN_MSB) of the segment number is included in the entries to indicate when the segment number LSB of the entries exceeds a maximum threshold of the segment number LSB; and
      retransmit the segments corresponding to the segment numbers of the segments that were not received by the receiving node.

2. The communication node of claim 1, wherein the message further comprises a pad, the pad comprising a number of bits determined such that a length of the message is an integer multiple of a length of each of the plurality of segments.

3. The communication node of claim 1, wherein the plurality of least significant bits comprises eight bits and wherein the segment number comprises fourteen bits.

4. The communication node of claim 1, wherein the processor is further configured to:
   start a counter after transmitting the PDU;
   transmit via the I/O module a plurality of additional PDUs to the receiving node;
   determine whether the counter has reached or exceeded a threshold without receiving the SACK message for the PDU and the additional PDUs; and
   in response to determining the counter has exceeded the threshold, transmit a SACK retransmission request.

5. The communication node of claim 4, wherein the SACK retransmission request comprises:
- a first field comprising an indicator of an oldest transmitted unacknowledged segment;
- a second field comprising an indicator of a most recent segment transmitted; and
- a third field comprising an indicator of a length of the message.

6. The communication node of claim 4, wherein the counter is configured to be incremented based on a statistic related to transmission of the PDU or an additional PDU.

7. The communication node of claim 4, wherein the counter is configured to be incremented based on occurrence of at least one condition from the group consisting of transmission of the PDU or an additional PDU; receipt of the SACK message; passage of time after the communication node expects to receive the SACK message; and transmission of a SACK retransmission request.

8. A method for segmenting and transmitting a datagram by a communication node in a network, the method comprising:
- determining whether a length of the datagram is greater than a maximum protocol data unit (PDU) length of a protocol of the network;
- creating a message for segmenting comprising the datagram and a payload length field indicating the length of the datagram;
- segmenting the message into a plurality of segments, each of the plurality of segments is of equal length;
- creating a PDU comprising one or more of the segments and a segment number least significant bits (LSB) field;
- transmitting the PDU to a receiving node;
- receiving a selective acknowledgment (SACK) message from the receiving node, the SACK message comprising entries corresponding to segment numbers that were not received by the receiving node, wherein a segment number most significant bits (SN_MSB) of the segment number is included in the entries to indicate when the segment number LSB of the entries exceeds a maximum threshold of the segment number LSB; and
- retransmitting segments corresponding to the segment numbers of the segments that were not received by the receiving node.

9. The method of claim 8, wherein the message further comprises a pad comprising one or more bits, and further comprising determining a length of the pad such that a length of the message is an integer multiple of a length of each of the plurality of segments.

10. The method of claim 8, wherein the segment number LSB field comprises a plurality of LSBs, each comprising a plurality of least significant bits of a segment number, wherein a plurality of segment numbers are associated with the plurality of segments.

11. The method of claim 8 further comprising:
- starting a counter after transmitting the PDU;
- transmitting a plurality of additional PDUs to the receiving node;
- determining whether the counter has reached or exceeded a threshold without receiving the SACK message for the PDU and the additional PDUs; and
- in response to determining the counter has exceeded the threshold, transmitting a SACK retransmission request.

12. The method of claim 11, wherein the SACK retransmission request comprises:
- a first field comprising an indicator of an oldest transmitted unacknowledged segment;
- a second field comprising an indicator of a most recent segment transmitted; and
- a third field comprising an indicator of a length of the message.

13. The method of claim 11, wherein the counter is configured to be incremented after the communication node expects to receive the SACK message.

14. The method of claim 11, wherein the counter is configured to be incremented based on occurrence of at least one condition from the group consisting of transmission of the PDU or an additional PDU; receipt of the SACK message; passage of time after the communication node expects to receive the SACK message; and transmission of a SACK retransmission request.

* * * * *